Oct. 19, 1965　　　D. W. BRITE ETAL　　　3,213,163
FABRICATION OF SHAPES BY PNEUMATIC IMPACTION
Filed Feb. 19, 1965

INVENTORS
Daniel W. Brite
Kenneth R. Sump

Attorney

3,213,163
FABRICATION OF SHAPES BY PNEUMATIC IMPACTION
Daniel W. Brite and Kenneth R. Sump, Richland, Wash., assignors to the United States of America as represented by the United States Atomic Energy Commission
Filed Feb. 19, 1965, Ser. No. 434,152
10 Claims. (Cl. 264—.5)

This invention relates to a method for producing an object from a cermet. More specifically, the invention relates to a method for making a nuclear-fuel element of the grid type from a cermet.

In nuclear power reactors it is desirable that the fuel elements have a high surface-to-volume ratio in order to provide for good heat exchange between the nuclear fuel and the coolant. It is also desirable that the fuel have a high heat conductivity and high mechanical integrity.

In application Serial No. 365,219 filed May 5, 1964, we have disclosed a process of making highly desirable nuclear fuels composed of cermets. These cermets are highly compacted mixtures of metals with oxides of uranium, plutonium, or both, or other fissionable ceramics, e.g., carbides, nitrides, etc. They are produced by subjecting mixtures of finely divided metals and fissionable ceramics to the impact of a rapidly moving piston of such mass and velocity that pressures of several hundred thousand pounds per square inch are applied to the mixture, thereby forming a solid mass of high heat conductivity and high mechanical strength.

Our present invention relates to an improvement on our prior process. We have developed a method, utilizing an impaction of the type disclosed in our prior application, of forming integral cermet grids. Moreover, we can, if desired, form simultaneously an integral metal coating on the cermet. The grid may thus be used in direct contact with a cooling medium which reacts with the ceramic but not with the metal.

We pack the mixture of ceramic and metal powders in a ductile metal mold which comprises a large number of posts or mandrels, which are spaced in such a manner that the open area between them has the general shape of the desired grid. The mold is confined within a die and subjected to an impact producing pressure of several hundred thousand pounds per square inch. The impact is applied longitudinally of the posts, compressing them longitudinally and expanding them laterally. The powder mixture is compressed in all directions and is compacted into a solid cermet. The mold is then removed by dissolving it in a reagent which does not attack the oxides or the metal of the cermet.

The surfaces of the mold which contact the powder may be plated with a metal not attacked by the reagent used to dissolve the mold. Usually, this will be the same as the metal component of the cermet. When the mold is dissolved, this plating remains adhering tightly to the surface of the cermet.

As the metal component of the cermet, we have successfully employed tungsten, molybdenum, and stainless steel. The mold is normally mild steel. When the metallic component of the cermet is tungsten, we have found molybdenum to be very satisfactory for the mandrels. It is important that the coefficient of thermal expansion of the mandrel match as closely as possible that of the cermet, that it be moderately ductile at the impaction temperature, and that it can be selectively dissolved.

Figure 1:
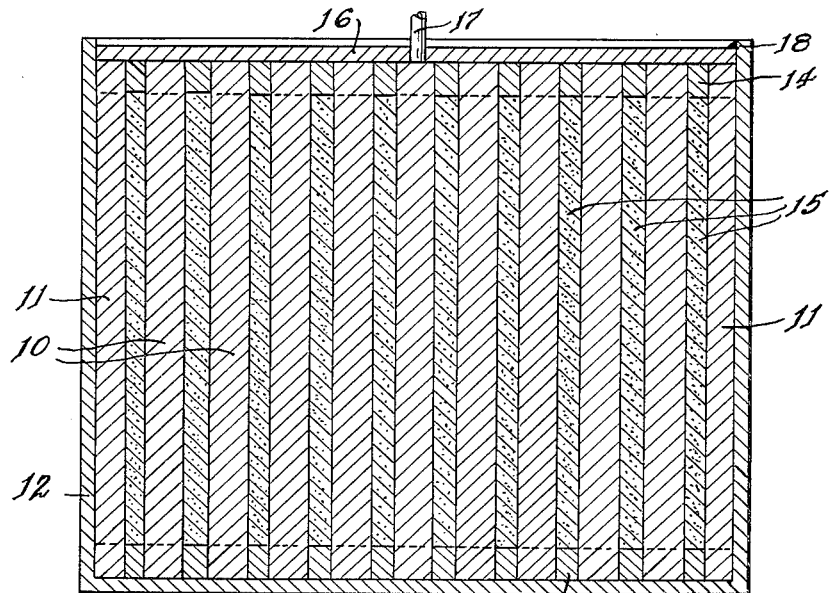
FIG. 1 is a longitudinal sectional view taken on the line 1—1 of FIG. 2, showing an assembly of can, posts, mandrels, and plates, and cermet adapted to be compacted.
Figure 2:
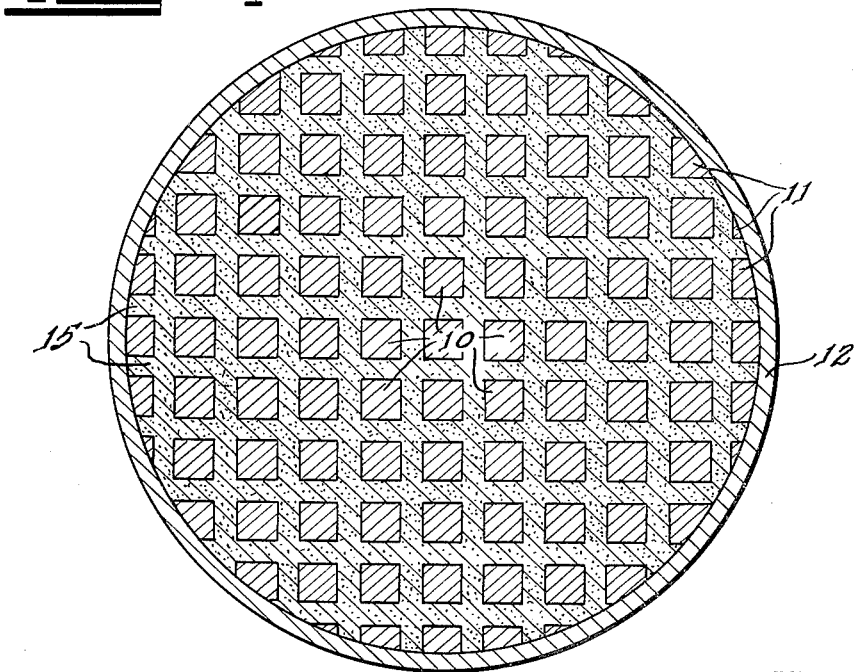
FIG. 2 is a transverse sectional view taken on the line 2—2 of FIG. 1.

A plurality of square mandrels 10 of mild steel are arranged in spaced parallel relation to one another on a square pattern or lattice. The mandrels 10 all have the same length and cross sections. Around the outermost square mandrels 10 a plurality of posts 11 of mild steel are arranged in spaced parallel relation to one another and to the mandrels on the same square pattern. The posts 11 have a cross section of incomplete squares of the same sizes as the mandrels 10, are planar on two or three sides, and have another curved side conforming to the interior of a stainless steel can 12 of circular cylindrical shape. If the grid is to be machined to shape, posts 11 can be omitted.

The lower flat ends of the mandrels 10 are welded in square holes through lower plate 13 of mild steel. The lower ends of the posts 11 are welded in partially square holes through the lower plate 13. The lower plate engages the lower end of the jacket 12, is circular, and has the same diameter as the inner diameter of the can 12.

An upper plate 14 of mild steel also has matching square holes and partially square holes, respectively, receiving the upper pointed ends of the mandrels 10 and the posts 11. The upper plate 14 is circular, and has the same diameter as the inner diameter of the can 12.

The spaces between the mandrels 10 and the posts 11 are filled with a powder mixture 15 composed of an intimate mixture of metal and oxide powders compacted by vibration. A suitable method of vibratory compaction is disclosed in U.S. Patent No. 3,042,594, granted July 3, 1964, to J. J. Hauth.

The assembling of the parts is as follows: The mandrels 10 and posts 11 are inserted in the holes in the lower plate 13. The upper plate 14 is applied to the mandrels 10 and posts 11 so as to receive the upper ends thereof in the holes in the upper plate. The mandrels 10 and posts 11 are welded to the lower plate 13. The upper plate 14 is removed. The welded structure is placed in can 12. The spaces between the posts 11 and mandrels 10 are filled with the powder mixture 15, densified by continuous vibratory compaction as the powder is poured. When the compacted powder mixture 15 is at the desired height on the mandrels 10 and the posts 11, the upper plate 14 is again applied so as to receive the upper ends of the mandrels and posts in its holes. Excess length of mandrels 10 and posts 11 is removed by machining flush to the upper plate 14. A cover 16 having an evacuation tube 17 is then inserted and welded to the can 12 about its periphery 18. The can contents are evacuated during heating to some temperature below the reaction temperature of the metal and oxide forming the powder mixture 15, for example, 1200° C. Evacuation is necessary to remove any gases that might otherwise cause an undesirable high internal pressure and cracking of the can, and cause pores in the cermet which would degrade its properties. The outgas tube is cut and sealed and the can and assembly are ready for high-energy compaction.

Such compaction may be carried out by a so-called Dynapak machine (not shown), which comprises essentially a stationary circular cylindrical hollow die engaging the sides of the can, a stationary end die engaging one end of the can, and a movable end die or punch which is applied with great force and speed against the other end of the can. The operation of this machine is described in our application S.N. 365,219. This operation is carried out when the assembly is at the pre-heat temperature.

The action on the assembly consisting of mandrels 10, posts 11, can 12, plates 13 and 14, and powder mixture 15 is to shorten the length of the assembly while preventing it from increasing in diameter. Thus the powder mixture 15 is additionally compacted, not only because it decreases in length without increasing in diameter, but also because the thickness of the walls of the honeycomb in which the powder mixture is shaped decreases. Thus thinning of the walls of the honeycomb occurs, because the mandrels 10, posts 11, and can 12 being essentially uncompressible, increase in dimensions perpendicular to their length as they decrease in length. Thus a very great compaction of the powder mixture 15 occurs.

After the compaction operation and cooling, the can is removed by turning, the end plates 13 and 14 are removed by turning, and finally the mandrels 10 and posts 11 are removed by being dissolved out by an acidic solution, typically hydrochloric when mandrels 10 are steel and a mixture of nitric and sulphuric when they are molybdenum.

The passages in the powder mixture 15 produced by removal of the mandrels 10 and posts 11 may have a coating of tungsten resulting from a vapor deposition or flame spray of tungsten on the mandrels. The solution for removing the mandrels has no effect on the tungsten deposition and leaves it as a tungsten coating on the surface of the cermet.

The process of the present invention has been carried out successfully according to the following example: At the outset the mild steel mandrels 10 has a length of 4" between plates 13 and 14 and were .187" in width and thickness. At the outset the powder mixture 15 had a density of 60% theoretical density after compaction vibration and a thickness of web or wall of .058" between adjacent mandrels 10. At the finish, i.e., after compaction in the Dynapak machine, the mandrels 10 had a length of 3.35" between plates 13 and 14 and were .205" thick on each side. At the finish the powder mixture had a density of 97% theoretical density and a web or wall thickness of .404". The pressure developed by the impact was about 250,000 lbs./in.$^2$.

In this particular instance the cermet was a mixture of 58% by volume of molybdenum and 42% by volume of uranium dioxide. We have also successfully fabricated cermets containing 50% to 95% by volume of tungsten, the remainder being uranium oxide.

The grid need not have square openings. They can be hexagonal, or circular or the grid may be composed of concentric circular rings and radial connecting walls.

While the mandrels are ordinarily parallel they may in some cases be arranged in a frustoconical array.

A plurality of fuel grids may be arranged so that the coolant passes through them in series. They may be arranged in contact with each other or may be spaced to provide for expansion. Moreover, the size of the openings in the grids may increase in the direction of coolant flow. This last expedient is particularly desirable in the case of gas-cooled reactors having a very great temperature gradient within the core, e.g., rocket reactors, utilizing initially liquid hydrogen as the working fluid.

It is also understood that the invention is not to be limited by the details given herein but that it may be modified within the scope of the appended claims.

The embodiments of the invention in which an exclusive property or privilege is claimed are defined as follows:

1. A method of making an object of the grid type from a cermet, said method comprising arranging a plurality of mandrels within a can in spaced relation to one another, filling the spaces between the mandrels and the can with a cermet mixture, confining the can exteriorly to prevent it from expanding, and simultaneously applying force against the ends of the can, the ends of the mandrels, and the cermet mixture in the direction of the length of the mandrels so as to shorten the can and mandrels, to increase the thickness of the can and the mandrels, and to compact the cermet powder by decreasing its dimension in the direction of the length of the mandrels and decreasing the thickness of its walls or webs by increase in the thickness of the mandrels and can.

2. The method specified in claim 1 and further comprising the step of removing the mandrels by dissolving them so as to leave passages within the compacted cermet.

3. The method specified in claim 2, the cermet being a mixture of tungsten and $UO_2$, and the mandrels being of mild steel.

4. The method specified in claim 3, the mandrels having a coating of tungsten applied by vapor deposition, the coating remaining on the passages in the cermet after dissolution of the mandrels.

5. The method defined in claim 2, the cermet being a mixture of uranium dioxide and molybdenum and the mandrels being mild steel.

6. The method as defined in claim 3, the cermet being a mixture of uranium dioxide and tungsten and the mandrels being molybdenum.

7. The method of claim 1 when the cermet consists essentially of a ceramic selected from the group consisting of uranium dioxide, plutonium dioxide, mixtures of uranium dioxide and plutonium dioxide, uranium carbide, plutonium carbide, mixtures of uranium carbide and plutonium carbide, uranium nitride, plutonium nitride, and mixtures of uranium nitride and plutonium nitride, and a compatible metal.

8. The method of claim 7, wherein the metal is selected from the group consisting of tungsten, molybdenum, and stainless steel.

9. The method specified in claim 1 and further comprising the step of preliminarily compacting the cermet mixture by vibration.

10. The method specified in claim 9, end plates being applied against the ends of the can, posts, and mandrels and having holes receiving the ends of the posts and the mandrels.

References Cited by the Examiner

UNITED STATES PATENTS

| | | | |
|---|---|---|---|
| 881,644 | 3/08 | Winne | 264—313 |
| 2,172,243 | 9/39 | Goodnow et al. | 264—313 |
| 3,061,873 | 11/62 | Supitilov et al. | 264—313 |
| 3,089,189 | 5/63 | Feldman et al. | 264—313 |

CARL D. QUARFORTH, *Primary Examiner.*